United States Patent [19]

Cronkhite et al.

[11] Patent Number: 5,451,015
[45] Date of Patent: Sep. 19, 1995

[54] CRASHWORTHY COMPOSITE AIRCRAFT STRUCTURE WITH INTEGRAL FUEL TANK

[75] Inventors: James D. Cronkhite, Hurst; Victor L. Berry; Michael R. Smith, both of Bedford, all of Tex.

[73] Assignee: Bell Helicopter Textron Inc., Fort Worth, Tex.

[21] Appl. No.: 63,937

[22] Filed: May 18, 1993

[51] Int. Cl.⁶ ............................ B64C 1/06; B64D 37/06
[52] U.S. Cl. ................................ 244/135 R; 244/119
[58] Field of Search .............. 244/117 R, 119, 135 R, 244/135 B, 131, 17.11; 188/377, 375, 376; 248/548

[56] References Cited

U.S. PATENT DOCUMENTS

| | | | |
|---|---|---|---|
| 2,430,905 | 11/1947 | Bradley | 244/135 B |
| 3,082,846 | 7/1959 | Jensen et al. | |
| 3,143,321 | 7/1962 | McGehee et al. | |
| 3,787,279 | 1/1974 | Winchester | 244/135 B |
| 3,983,962 | 10/1976 | Torke | 188/377 |
| 4,023,652 | 5/1977 | Torke | 188/377 |
| 4,084,029 | 4/1978 | Johnson et al. | 244/131 |
| 4,172,573 | 10/1979 | Moore et al. | |
| 4,336,868 | 6/1982 | Wilson et al. | |
| 4,593,870 | 6/1986 | Cronkhite et al. | |
| 4,957,250 | 9/1990 | Hararat-Tehrani | |
| 5,035,307 | 7/1991 | Sadeghi et al. | |
| 5,069,318 | 12/1991 | Kulesha et al. | |

OTHER PUBLICATIONS

Turnbow et al, "Crash Survival Design Guide" USAA VLABS Tech Rep 67-22, pp. Cover-76 and 187-241.

Primary Examiner—Galen L. Barefoot
Attorney, Agent, or Firm—John M. Cone; William L. Clayborn

[57] ABSTRACT

A dual-purpose bulkhead structure functions to support normal aircraft operational loads and to absorb energy in a controlled manner during a crash. An integral fuel tank comprises a fuel compartment and a crashworthy flexible fuel cell. The fuel compartment includes two dual-purpose bulkheads and crushable foam disposed between the sides of the fuel cell and the bulkheads and sides of the fuel compartment. The foam limits fuel pressure loads on fuel compartment bulkheads and sides during a crash, thereby preventing their failure.

5 Claims, 3 Drawing Sheets

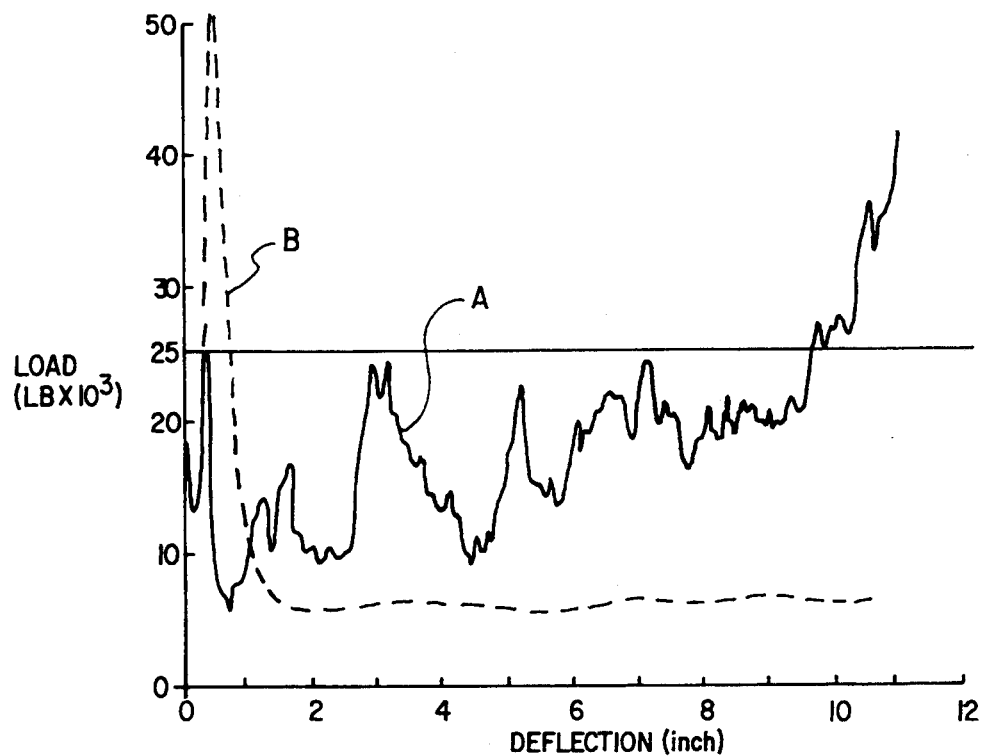
FIG. 5
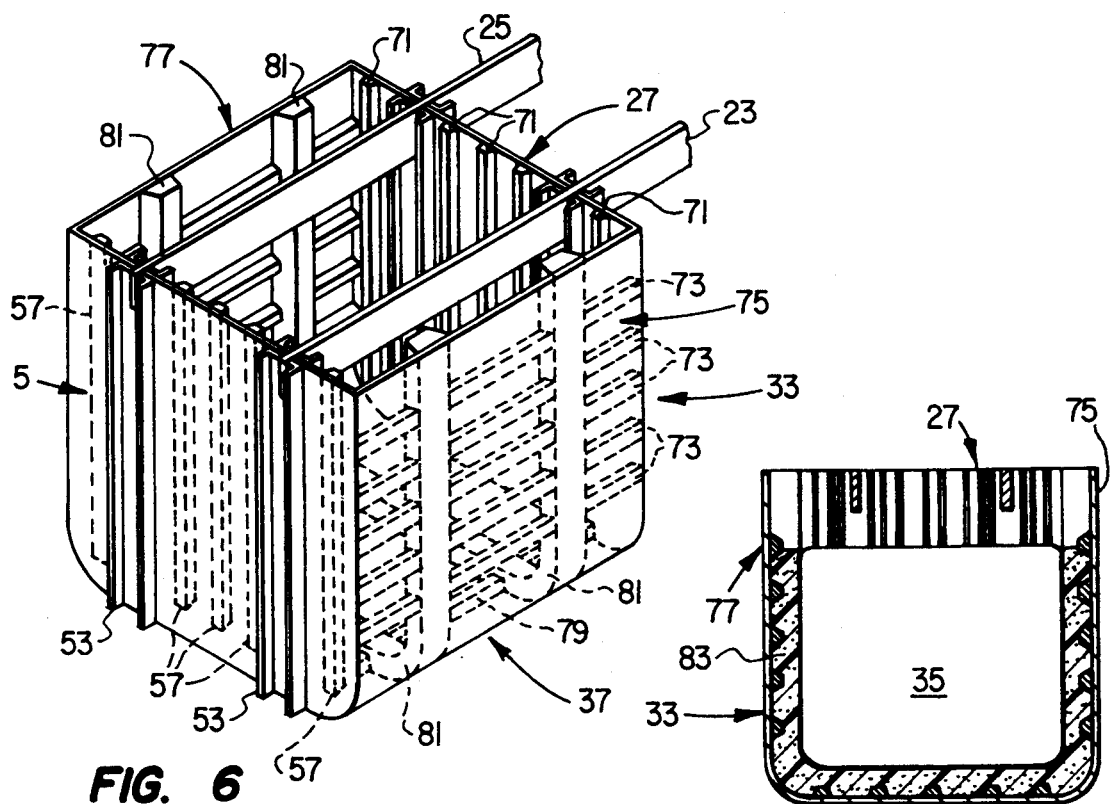
FIG. 6
FIG. 7

CRASHWORTHY COMPOSITE AIRCRAFT STRUCTURE WITH INTEGRAL FUEL TANK

BACKGROUND OF THE INVENTION

This invention relates generally to aircraft structures and, more particularly, to a crashworthy composite aircraft structure.

The purpose of a crashworthy aircraft structure is to ensure the structural integrity of critical portions of the aircraft structure during a crash to prevent or minimize injury to the aircraft's occupants. To accomplish that goal, one or more crushable structures have been provided to absorb crash energy in a controlled manner.

In U.S. Pat. No. 4,593,870 (Cronkhite et al.), crushable, energy absorbing structures ("crush structures") are provided below a helicopter's fuel compartment and below its passenger compartment adjacent to the pilots' compartment. In a crash, the crush structures limit the peak load experienced by the aircraft's occupants, thereby preventing injury due to excessive decelerative forces. In addition, the helicopter's propulsion system is mounted above the passenger and fuel compartments and is supported by their structures. Should the passenger and fuel compartment structures fail and lose their structural integrity, the propulsion system could intrude into those compartments, possibly injuring the passengers and/or breaching the fuel tank, possibly causing a fire. By limiting the peak crash loads experienced by the passenger and fuel compartment structures, the crush structures act to maintain the structural integrity of those compartments.

U.S. Pat. No. 5,069,318 (Kulesha et al.) discloses a self-stabilizing crush structure which includes composite columnar stiffeners in which the cross section of each member increases from one end to the other. When such a stiffener is crushed, the crushing begins at the end having the smaller cross-sectional area and progresses toward the end having the greater cross-sectional area. While the columnar stiffeners are the chief energy absorbing members, it will be recognized that the keel beams and bulkheads of the crush structure also absorb significant energy as they are crushed.

The crush structures disclosed in Cronkhite and Kulesha comprise a complex arrangement of longitudinal keel beams, lateral bulkheads, and vertical stiffeners. Further, in both Cronkhite and Kulesha, the energy absorbing function requires structure in addition to that which reacts normal operational loads. A dual-purpose structure which functions to react normal operational loads and to absorb crash energy would simplify and lighten the aircraft's structure, be easier and cheaper to construct, and be easier to inspect.

In some aircraft the structure of the fuel compartment is sealed and the compartment serves as the aircraft's fuel tank. However, such a fuel tank is prone to developing fuel leaks. For that reason, many aircraft employ a flexible fuel cell that is contained within the fuel compartment.

A modern flexible fuel cell is constructed of a rubberized fabric and is itself crashworthy; that is, it does not require an energy absorbing structure below it to maintain structural integrity in a crash. However, if no crush structure is provided below the fuel cell, the high peak load the fuel cell experiences in a crash generates a significant hydrodynamic pressure within the fuel cell. That pressure causes significant horizontal bulging of the fuel cell.

The fuel compartment's bulkheads and sides must possess a certain inherent level of horizontal rigidity in order to react the loads associated with normal operations. If the fuel cell is in contact with those bulkheads and sides, the fuel cell bulging resulting from the peak hydrodynamic fuel pressure experienced in a crash will exceed that inherent rigidity, causing the bulkheads and sides to bulge and possibly fail. Such bulging also decreases the vertical structural rigidity of the bulkheads and sides and may result in their failure due to vertical loads. To prevent failure due to bulging, the horizontal rigidity of the fuel compartment bulkheads and sides could be increased to resist the peak pressure fuel cell bulging, which would increase the weight of the fuel cell structure. Alternately, the width and length of the fuel compartment could be increased and the fuel cell positioned horizontally within the fuel compartment so that, at peak fuel cell bulge, the load applied to the fuel compartment bulkheads and sides would not exceed their inherent horizontal rigidity. However, the latter alternative would obviously require additional fuel compartment structure, again increasing its weight. An efficient means for limiting the horizontal load on the fuel compartment's bulkheads and sides due to fuel cell bulging would provide the maximum fuel capacity for a given fuel compartment size, thereby minimizing the weight of the fuel compartment.

SUMMARY OF THE INVENTION

In accordance a first aspect of the present invention, an aircraft bulkhead structure is provided which serves the dual purposes of supporting normal operational loads and absorbing energy in a controlled manner during a crash. The bulkhead comprises a thin planar member and one or more stiffeners. The planar member and the stiffeners are tapered near the bottom of the bulkhead to initiate crash energy absorption in a bulkhead crush zone. Such tapering serves as a "trigger" mechanism to develop progressive crushing failure mode energy absorption.

In accordance with a second aspect of the invention, an integral fuel tank is provided which comprises a fuel compartment and a crashworthy flexible fuel cell. The fuel compartment includes two dual-purpose bulkheads. During a crash, crushable foam between the sides of the fuel cell and the fuel compartment bulkheads and walls limits the bulging loads applied to those members due to hydrodynamic fuel pressure, thereby preventing their failure.

BRIEF DESCRIPTION OF THE DRAWINGS

An embodiment of the invention will be described, by way of example only, with reference to the accompanying drawings, in which:

FIG. 5 is a graph showing the crush zone load-deflection characteristics of the bulkhead crush zone of FIG. 2 and that of a conventional bulkhead;

FIG. 6 is an isometric view of the fuel compartment of FIG. 1 viewed from the front;

FIG. 7 is a view of the fuel compartment of FIG. 1 taken through plane 7—7;

DETAILED DESCRIPTION

Figure 1:
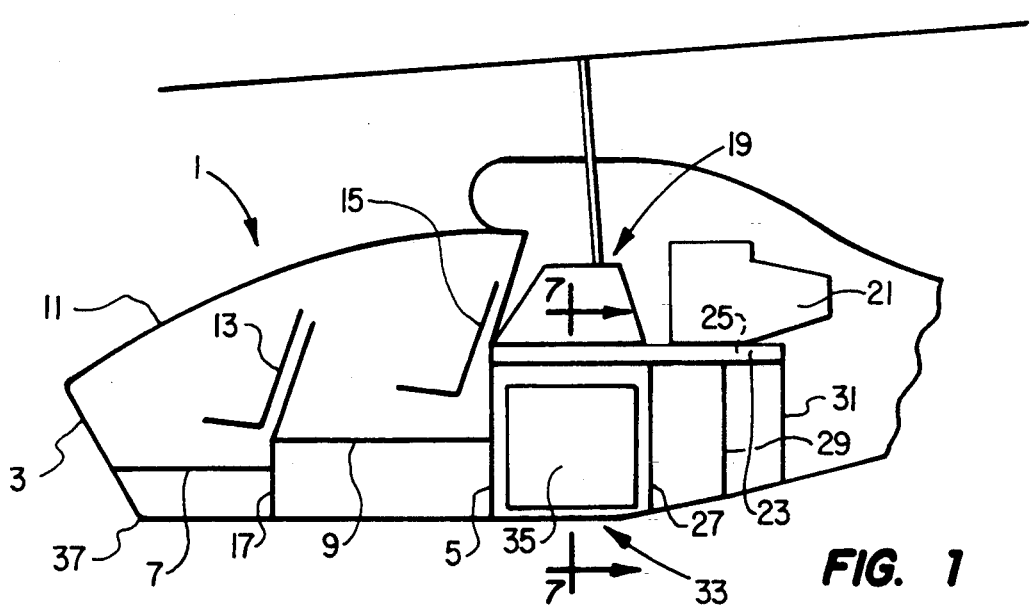
FIG. 1 is a diagrammatic view of a the central portion of a helicopter fuselage looking inboard from the left side.

FIG. 1 illustrates a central portion of a helicopter fuselage looking inboard from the left side with the left side skin broken away. A crew compartment 1 is defined by bulkheads 3 and 5, floors 7 and 9, a canopy 11, a left side skin (not shown), and a right side skin (not shown). Two crew member seats 13 and 15 are attached to bulkheads 17 and 5, respectively. A gearbox-rotor assembly 19 and a turbine engine 21 are supported by a pair of laterally-spaced composite beams 23 and 25. The beams 23 and 25 are supported by four bulkheads 5, 27, 29, and 31. Bulkheads 5 and 27 also serve as the front and rear bulkheads, respectively, of a fuel compartment 33. The portion of the helicopter's belly skin 37 between the bulkheads 5 and 27 serve as the bottom of the fuel compartment 33. In like manner, the portions of the helicopter's side skins (not shown) serve as the sides of the fuel compartment 33. A flexible, crashworthy fuel cell 35 is contained within the fuel compartment 33.

Figure 2:
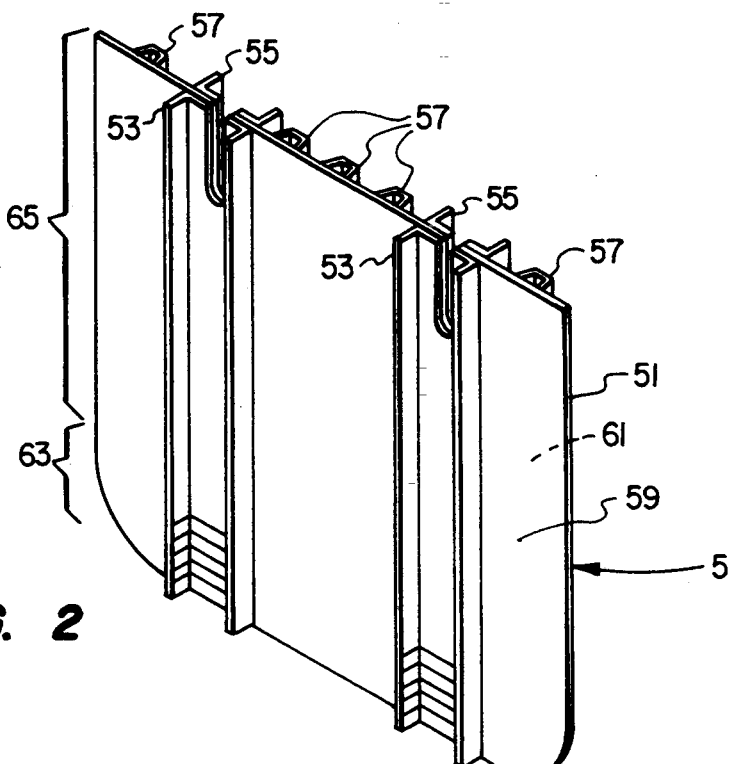
FIG. 2 is a front perspective view of a dual-purpose bulkhead embodying one aspect of the present invention.

FIG. 2 illustrates a dual-purpose bulkhead constructed in accordance with one aspect of the present invention. The bulkhead shown is the front fuel compartment bulkhead 5 viewed from the front of the helicopter. The bulkhead 5 is constructed of a carbon fiber/toughened-resin composite material. It will be appreciated that the bulkhead 5 could be constructed of other composite materials, such as fiberglass/resin, or of metal, such as aluminum alloy.

The bulkhead 5 is comprised of a thin (seven plies) planar member 51, four relatively thick (12 plies) 2.5×1.0 inch C-channel members 53 and 55, and five thin (six plies) 1.5×1.5 inch tapered hat stiffeners 57. Two channels 53 are attached to the front face 59 of the planar member 51, and two channels 55 are attached to the rear face 61. The five hat stiffeners 57 are attached to the rear face 61 of the planar member 51. The channels 53 and 55 and the hat stiffeners 57 contribute significantly to the vertical and bending strength and stiffness of the bulkhead 5.

In this embodiment, the channels 53 and 55 and the hat stiffeners 57 are epoxied to the planar member 51. It will be appreciated that any conventional means of attachment, such as rivets, screws, or bolts, may be used.

The bulkhead 5 serves two purposes: it reacts normal operational loads and it absorbs crash energy. In a crash, the helicopter is exposed to very high vertical forces which tend to compress the bulkhead vertically. The compressive crash loads cause a crush zone 63 (the lower 10 inches of the bulkhead 5) to crush in a controlled manner, absorbing energy and thereby limiting the load that is applied to an upper zone 65 of the bulkhead (the top 32 inches). As a result, the integrity of the helicopter structure adjacent to the bulkhead 5 is maintained.

Figure 3:
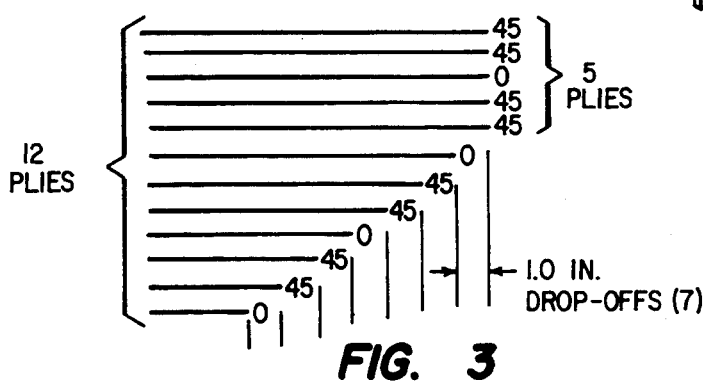
FIG. 3 is a diagrammatic view showing the manner of laying up the bottom portion of the C-channels of FIG. 2.
Figure 4:
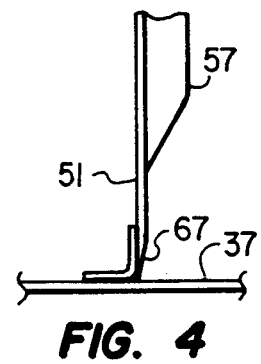
FIG. 4 is a side view showing the tapers of the planar panel and hat stiffeners adjacent to where the bulkhead of FIG. 2 joins the belly skin of the helicopter.

In the upper zone 65 of the bulkhead 5, the cross-sectional areas of the planar member 51, channels 53 and 55, and hat stiffeners 57 are constant. In the lower portion of the crush zone 63 the cross-sectional areas are varied by tapering each of those members. Referring to FIG. 3, during the layup of the channels 53 and 55 are tapered by progressively decreasing the plies of carbon fiber material from twelve, at seven inches above the bottom of the bulkhead 5, to five at the bottom. Alternately, the channels 53 and 55 could be layed up using twelve plies and the bottom seven inches tapered mechanically, such as by grinding. Referring to FIG. 4, the bottom edge of the planar member 51 is tapered to a chisel point 67. The hat stiffeners 57 are tapered mechanically and terminate approximately two inches above the belly skin 37. Due to the described tapering of the planar member 51, channels 53 and 55, and hat stiffeners 57, crash energy absorption is initiated at the bottom of the crush zone 63.

Curve A in FIG. 5 shows the load-deflection characteristic obtained by subjecting one half (from the centerline to the side) of the bulkhead crush zone 63 described above to compressive forces using a Tinius-Olsen testing machine. Crushing began at the bottom of the crush zone 63 and progressed upwardly. No peak load exceeded 25,000 pounds until more than 9.5 inches of the crush zone 63 had been crushed. Above 9.5 inches deflection, substantially no crush zone 63 remained; therefore, the portion of curve A beyond that point may be disregarded.

By way of comparison, curve B shows our estimate of the load-deflection characteristic of a prior art bulkhead that does not include the tapered members of the present invention. In curve B, the high peak load value followed by a relatively low load value indicates structural failure, which would cause a loss of structural integrity of the helicopter adjacent to the bulkhead.

Bulkheads 17 and 27–31 are all constructed in same general manner as bulkhead 5. It will be appreciated that the bulkheads vary in details (such as dimensions, number of stiffeners, and number of plies used in the construction of the members) depending on where they are located in the aircraft. However, each bulkhead comprises a thin planar member 51 having at least one channel 53 or 55 attached thereto.

In this embodiment, the bulkheads 5, 17, and 27–31 are optimized for vertical loads. It will be recognized that the principles of this aspect of the present invention can easily be adapted to absorb energy along any axis of an aircraft or other vehicle.

Referring again to FIG. 1, it can be seen that the flexible crashworthy fuel cell 35 rests directly on the fuel compartment belly skin 37. Heretofore, this would not have been possible. With prior art energy absorbing structures, to absorb the crash energy of the gearbox-rotor assembly 19, considerable space would have to be provided below the fuel cell 35 and above the fuel compartment belly skin 37. With the fuel compartment 33 of this aspect of the present invention, during a crash, the energy of the fuel cell is transmitted through the fuel compartment belly skin 37 directly to the impact surface (not shown). Thus, to maintain structural integrity during a crash, the fuel compartment structure need have only sufficient strength to support the gearbox-rotor assembly 19 and sufficient energy absorption capability to absorb the gearbox-rotor assembly crash energy. In comparison, prior art structures required sufficient strength to support both the gearbox-rotor assembly 19 and the fuel cell 35 and the crush structure had to have sufficient energy absorbing capacity to absorb the crash energy of both the gearbox-rotor assembly 19 and the fuel cell 35. Accordingly, in the present invention, the weight of the fuel compartment structure is minimized.

FIGS. 6 and 7 illustrate the details of the helicopter's fuel compartment 33. The rear fuel compartment bulkhead 27 is a mirror image of the front fuel compartment bulkhead 5, having its hat stiffeners 71 on the inside of the fuel compartment 33.

Five longerons 73 are attached to the inner surface of the left fuel compartment side skin 75. The longerons 73 are hat stiffeners of the same dimensions and construction as the hat stiffeners 57 and 71 of the front and rear bulkheads 5 and 27. The right fuel compartment side skin 77 is identical to the left side skin 75. The fuel compartment belly skin 37 also has five longerons 79 (only one of which is shown in FIG. 6) attached to its inner surface. Two 1.0×3.0 inch (width by height) hat-section frames 81 are attached to the inner surfaces of the side skins 75 and 77 and the belly skin 37. The longerons 73 and 79 and the frames 81 stiffen the side skins 75 and 77 and the belly skin 37 of the fuel compartment 33, allowing them to react the operational loads imposed by the fuel cell 35.

The fuel compartment side skins 75 and 77 are designed to react an 8.3 psi fuel pressure bulging load without buckling. The fuel compartment bulkheads 5 and 27 are designed to react a 10.0 psi bulging load without buckling. As a result, the side skins 75 and 77 will deform before the bulkheads 5 and 27 to relieve the fuel pressure loads in a crash. Thus, the primary energy absorbing structures, the bulkheads 5 and 27, remain straight during a crash, ensuring maximum energy absorbing efficiency.

Figure 8:
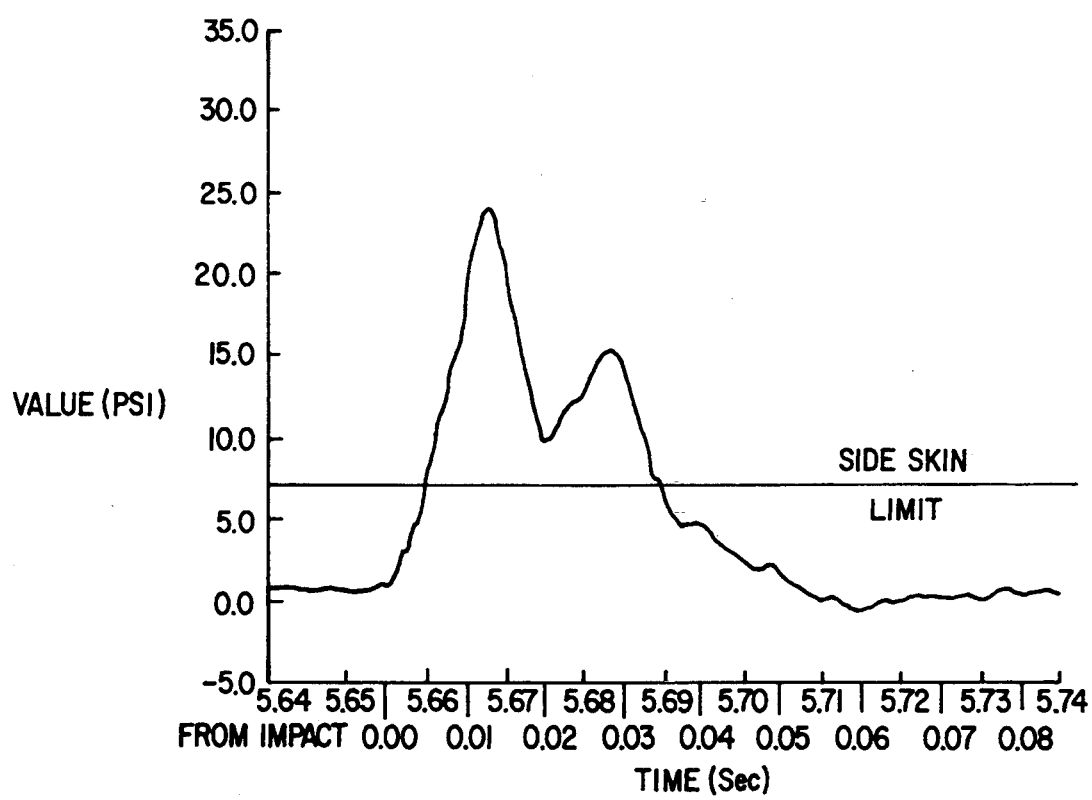
FIG. 8 is a graph of the fuel pressure in the fuel cell during a test drop.

During a crash, the hydrodynamic fuel pressure exceeds the buckling strengths of the fuel compartment side skins 75 and 77 and bulkheads 5 and 27 by a wide margin (see FIG. 8). To limit the buckling loads imposed on the fuel compartment side skins 75 and 77 and the bulkheads 5 and 27, a three-inch layer of polyurethane foam 83 is disposed between the sides of the fuel cell 35 and the fuel compartment side skins 75 and 77 and bulkheads 5 and 27. The foam layer 83 is also disposed between the bottom of the fuel cell 35 and the fuel compartment belly skin 37 to provide a flat surface for the bottom of the fuel cell.

The foam 35 used in this embodiment crushes at an average pressure of 23.4 psi. To "tune" the foam, approximately two-thirds of the foam area is removed to a depth of approximately 1.69 inches, yielding a structure which crushes at slightly less than the 8.3 psi buckling pressure of the side skins 75 and 77. The cutout portion of the foam layer 83 is disposed adjacent to the side skins 75 and 77 and bulkheads 5 and 27 of the fuel compartment 33. The foam 83 between the fuel cell 35 and the fuel compartment belly 37 is not tuned.

Penetration of the fuel cell 35 by a ballistic projectile may result in a shock wave being propagated in the fuel contained therein. The effect of this "hydraulic ram" is similar to that of the hydrodynamic fuel pressure which occurs during a crash; that is, the shock wave may cause the excessive buckling loads to be imposed on the fuel compartment bulkheads 5 and 27 and side skins 75 and 77, thereby causing their failure. It will be appreciated that the foam layer 83 also acts to prevent failure of the fuel cell bulkheads 5 and 27 and side skins 75 and 77 due to hydraulic ram.

Figure 9:
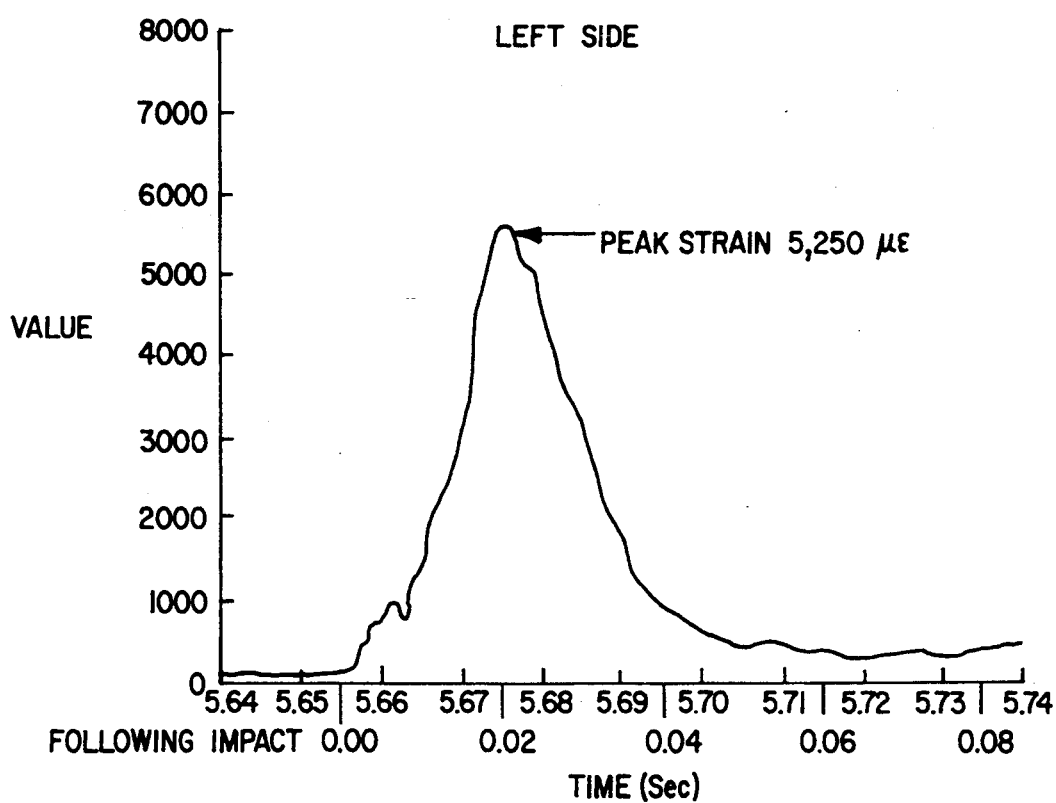
FIG. 9 is a graph of the fuel compartment left side skin strain during a test drop.

A full-scale drop test was conducted on the described fuel compartment. FIGS. 8 and 9 illustrate the results of that test.

The curve in FIG. 8 shows the fuel pressure during the test impact at a point approximately nine inches above the bottom of the fuel cell 35. As indicated on the time axis, impact occurred at 5.655 seconds. As can be seen, the maximum fuel pressure was approximately 25 psi, more that enough to buckle the fuel cell side skins 75 and 77 and bulkheads 5 and 27.

The strain curve shown in FIG. 9 was obtained by attaching a strain gage to the lowest longeron 73 of the left fuel compartment side skin 75. The allowable side skin strain is 0.0127 inches/inch. As can be seen, by limiting the fuel pressure load, the maximum strain experienced by the left side skin 75 was 0.00525 inches/inch, only 41% of the allowable strain. Thus, the test confirmed the anti-buckling utility of the tuned foam 83. In addition, the test confirmed the efficacy of the dual-purpose bulkhead design. The fuel compartment bulkheads 5 and 27, and the adjacent side skins 75 and 77, crushed upward from the bottom of the fuel compartment 33 and the structural integrity of the fuel compartment 33 was maintained.

While the preferred embodiment of the invention has been shown and described, it will be apparent to those skilled in this art that various modifications may be made to this embodiment without departing from the spirit of the present invention. For that reason, the scope of the invention is set forth in the following claims.

We claim:

1. A crashworthy aircraft fuel tank comprising:
   a fuel compartment formed by two bulkheads, two sides, and a bottom;
   the bottom of the fuel compartment serving as a portion of the outer skin of the aircraft;
   each bulkhead including a zone adapted to crush in a predictable, controlled manner when exposed to a compressive force exceeding a predetermined level; and
   a crashworthy flexible fuel cell disposed within the fuel compartment and supported by the bottom thereof; and
   the fuel compartment sides and bulkheads extending a substantial distance above said fuel cell when said fuel cell is fully fueled, thereby providing vertical clearance between said fuel cell and a member supported by said fuel compartment to prevent structural failure of said fuel compartment and damage to said fuel cell during a crash.

2. The fuel tank of claim 1 further comprising a crushable member disposed between the fuel cell and the fuel compartment sides and bulkheads, which crushable member is adapted to limit the buckling load imposed on the fuel compartment sides and bulkheads by the fuel cell to a predetermined level.

3. The fuel tank of claim 2 wherein the crushable member comprises a layer of foam material.

4. The fuel tank of claim 2 wherein the crushable member comprises a layer of foam material from which portions of the material have been removed.

5. The fuel tank of claim 2 wherein the crushable member comprises a plurality of crushable members.

* * * * *